United States Patent
Park

Patent Number: 5,755,637
Date of Patent: May 26, 1998

[54] POWER TRAIN FOR USE IN AUTOMATIC TRANSMISSION

[75] Inventor: Dong-Hoon Park, Kyunggi-Do, Rep. of Korea

[73] Assignee: Hyundai Motor Company, Rep. of Korea

[21] Appl. No.: 765,965

[22] PCT Filed: Jul. 19, 1994

[86] PCT No.: PCT/KR94/00094

§ 371 Date: Apr. 8, 1997

§ 102(e) Date: Apr. 8, 1997

[87] PCT Pub. No.: WO96/02773

PCT Pub. Date: Feb. 1, 1996

[51] Int. Cl.$^6$ .................................................. F16H 3/64
[52] U.S. Cl. .................. 475/275; 475/276; 475/284
[58] Field of Search ..................... 475/269, 275, 475/276, 284, 286

[56] References Cited

U.S. PATENT DOCUMENTS

| | | | |
|---|---|---|---|
| 3,971,267 | 7/1976 | Murakami et al. | 475/276 X |
| 4,224,837 | 9/1980 | Croswhite | 475/275 |
| 4,417,484 | 11/1983 | Gaus et al. | 475/276 X |
| 4,660,439 | 4/1987 | Hiraiwa | 475/284 X |
| 4,719,985 | 1/1988 | Zaiser | 475/276 X |
| 5,016,174 | 5/1991 | Ito et al. | 477/138 X |
| 5,030,187 | 7/1991 | Asada | 475/275 |
| 5,057,063 | 10/1991 | Asada et al. | 475/275 |
| 5,090,952 | 2/1992 | Asada | 475/275 |
| 5,091,854 | 2/1992 | Yoshimura et al. | 364/424.1 |
| 5,106,352 | 4/1992 | Lepelletier | 475/284 X |
| 5,261,861 | 11/1993 | Lemieux | 475/275 |
| 5,643,130 | 7/1997 | Park | 475/275 |
| 5,667,451 | 9/1997 | Park | 475/276 X |

FOREIGN PATENT DOCUMENTS

| | | | |
|---|---|---|---|
| 1555207 | 1/1971 | Germany | 475/276 |
| 5-346161 | 12/1993 | Japan | 475/275 |

*Primary Examiner*—Khoi Q. Ta
*Attorney, Agent, or Firm*—Finnegan, Henderson, Farabow, Garrett & Dunner, L.L.P.

[57] ABSTRACT

An automatic transmission for a motor vehicle comprises (a) an input shaft, (b) a compound planetary gear set coaxially mounted about the input shaft for rotation therewith, the compound planetary gear set operable under control of clutches and brakes to establish first to fourth forward drive ratios, (c) an output shaft lying in parallel with the input shaft, (d) a simple planetary gear set coaxially mounted about the output shaft for rotation therewith, the simple planetary gear set operable to provide fifth forward drive ratio by way of further increasing the pre-established fourth ratio, and (e) a chain and sprocket coupler for delivering rotary power from the compound planetary gear set to the simple planetary gear set. As an alternative, the chain and sprocket coupler may be replaced with drive and driven transfer gears which are kept in a mutually meshing relationship.

12 Claims, 3 Drawing Sheets

FIG.2

| | | C1 | C2 | C3 | C4 | C5 | B1 | B2 | B3 | F1 | F2 | F3 | ENGINE BRAKE |
|---|---|---|---|---|---|---|---|---|---|---|---|---|---|
| P | | | | | | | | | | | | | |
| R | | | ○ | | | ○ | | ○ | | | | | YES |
| N | | | | | | | | | | | | | |
| D | 1 | ○ | | | | ○ | | | | ○ | ○ | ○ | NO |
| D | 2 | ○ | | | | ○ | ○ | | | | ○ | ○ | NO |
| D | 3 | ○ | | ○ | | ○ | | | | | ○ | ○ | NO |
| D | 4 | ○ | | ○ | | ○ | ○ | | | | | ○ | YES |
| D | 5 | ○ | ○ | | | ○ | | ○ | | | | | YES |
| 4 | 1 | ○ | | | | ○ | | | | ○ | ○ | ○ | NO |
| 4 | 2 | ○ | | | | ○ | ○ | | | | ○ | ○ | NO |
| 4 | 3 | ○ | | ○ | | ○ | | | | | ○ | ○ | NO |
| 4 | 4 | ○ | | ○ | | ○ | ○ | | | | | ○ | YES |
| 3 | 1 | ○ | | | ○ | ○ | | | | ○ | ○ | ○ | NO |
| 3 | 2 | ○ | | | ○ | ○ | ○ | | | | ○ | ○ | YES |
| 3 | 3 | ○ | | ○ | ○ | ○ | | | | | ○ | ○ | YES |
| 2 | 1 | ○ | | | ○ | ○ | | | ○ | | ○ | ○ | YES |
| 2 | 2 | ○ | | | | ○ | ○ | ○ | | | ○ | ○ | YES |

POWER TRAIN FOR USE IN AUTOMATIC TRANSMISSION

FIELD OF THE INVENTION

The present invention is directed to an automatic transmission for use in an automobile; and, more particularly, to a power train of the type which comprises a compound planetary gear set arranged along a first transmission shaft for providing first to fourth forward drive ratios and one reverse drive ratio and a simple planetary gear set disposed on a second transmission shaft for accomplishing a fifth forward drive ratio, wherein the compound planetary gear set is operatively coupled to the simple planetary gear set through the use of a chain and sprocket coupler.

DESCRIPTION OF THE PRIOR ART

As is well-known in the art, the drivability or fuel economy of a motor vehicle can be heavily affected by the characteristics of its transmission, especially in case of an automatic power transmission. Hence, a variety of automatic transmissions has been developed in an effort to improve the performance characteristics, e.g., drivability or fuel economy of the automotive vehicle. Conventionally, the automatic transmission includes a power or gear train having at least two simple or one compound planetary gear set whose rotary movement is under close control of hydraulically operated clutches and brakes. As used herein, the term power train is interchangeable with the gear train. Similarly, the terms planet gear and pinion gear, and the terms annulus gear and ring gear are used synonymously. A hydraulic control system is employed to have the clutches and the brakes selectively engaged or released, thereby controlling the rotary movement of the planetary gear set in such a manner as to provide a desired drive ratio.

Since the advent of the automatic transmission, a great deal of efforts has been made to provide a compact, reliable, cost-effective gear train which satisfies various operating requirements. Recent trend has been to equip the automatic transmission with a gear train capable of providing five or more forward drive ratios and at least one reverse drive ratio.

For instance, U.S. Pat. No. 5,030,187 issued to Asada on Jul. 9, 1991 discloses an automatic transmission having a gear train which comprises first, second and third single-pinion planetary gear sets. The ring gear of the first single-pinion planetary gear set is connected integrally or selectively to the carrier of the second single-pinion planetary gear set. The carrier of the first single-pinion planetary gear set is connected integrally or selectively to the carrier of the third single-pinion planetary gear set; and the sun gear of the second single-pinion planetary gear set is connected integrally or selectively to the sun gear of the third single-pinion planetary gear set. The automatic transmission disclosed in the '187 patent is capable of operating in any one of at least five forward gears and one reverse gear.

Another type of automatic transmission is taught in U.S. Pat. No. 5,057,063 issued to Asada et al on Oct. 15, 1991 wherein there is provided a gear train for changing the rotational speed of an input shaft which consists of first and second single pinion type planetary gear sets and a third double pinion type planetary gear set. A sun gear of the first planetary gear set is normally or selectively connected to a carrier and a sun gear of the second planetary gear set; a carrier of the first planetary gear set is normally or selectively connected to a carrier of the third planetary gear set; the carrier of the second planetary gear set is normally or selectively connected to a sun gear of the third planetary gear set; a ring gear of the second planetary gear set is normally or selectively connected to a ring gear of the third planetary gear set; the input shaft is selectively connected to either one or both of the sun gear and the ring gear of the first planetary gear set; and the output shaft is connected to the sun gear of the third planetary gear set, whereby at least five forward speeds and one reverse speed are established.

U.S. Pat. No. 5,090,952 issued to Asada on Feb. 25, 1992 teaches a gear train for changing the rotational speed of an input shaft that consists of first and third single pinion type planetary gear sets and a second planetary double pinion type gear set. Ring gears of these three planetary gear sets are normally or selectively interconnected to each other; a carrier of the first planetary gear set is normally or selectively connected to a sun gear of the third planetary gear set; a sun gear of the first planetary gear set is normally or selectively connected to a sun gear of the second planetary gear set; and the sun gear of the second planetary gear set is normally or selectively connected to the carrier of the first planetary gear set, whereby at least five forward speeds and one reverse speed become available.

While the prior art automatic transmission systems referred to above have been offered, needs have continued to exist for an automatic transmission having an improved gear train which further enhances the vehicle drivability, fuel economy, adaptability, structural integrity and the like.

SUMMARY OF THE INVENTION

Accordingly, it is a primary object of the present invention to provide an automatic transmission for a motor vehicle which substantially eliminates various drawbacks inherent in conventional automatic transmissions and significantly improves the performance characteristics of the vehicle, with no or little penalty in the vehicle compactness and shift feeling.

In order to achieve the above object, in one aspect of the present invention, there is provided an automatic transmission for a motor vehicle comprising (a) an input shaft, (b) a compound planetary gear set coaxially mounted about the input shaft for rotation therewith, the compound planetary gear set operable under the control of clutches and brakes to establish first to fourth forward drive ratios, (c) an output shaft lying in parallel with the input shaft, (d) a simple planetary gear set coaxially mounted about the output shaft for rotation therewith, the simple planetary gear set operable to provide fifth forward drive ratio by way of further increasing the pre-established fourth ratio, and (e) a chain and sprocket coupler for delivering rotary power from the compound planetary gear set to the simple planetary gear set. As an alternative, the chain and sprocket coupler may be replaced with drive and driven transfer gears which are kept in a mutually meshing relationship.

BRIEF DESCRIPTION OF THE DRAWINGS

The above and other objects and features of the present invention will become apparent from the following description of preferred embodiments given in conjunction with the accompanying drawings, in which:

FIG. 2 is a table illustrating the operation sequence of clutches and brakes employed in the gear train shown in FIG. 1.

DETAILED DESCRIPTION OF THE PREFERRED EMBODIMENTS

Figure 1:
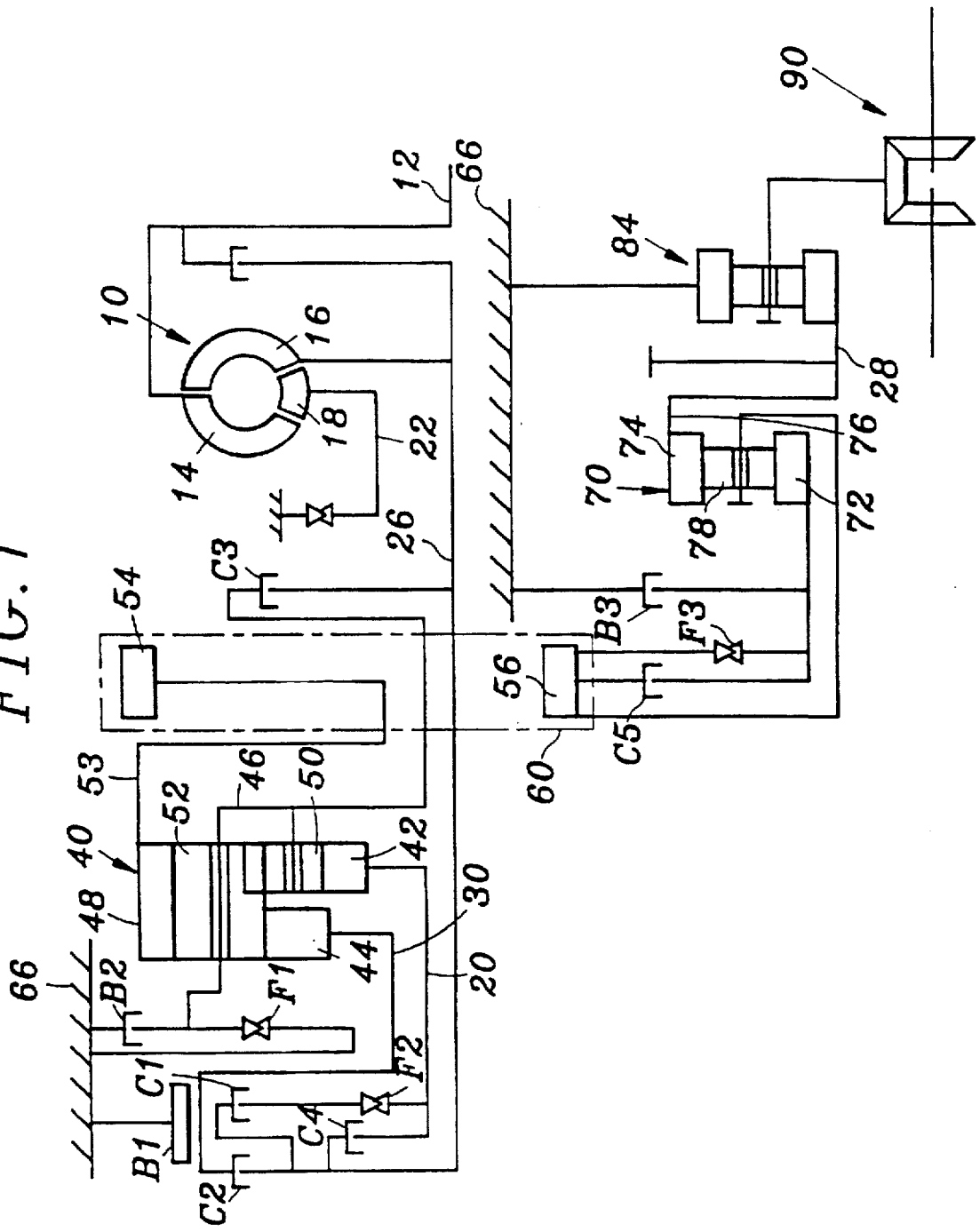
FIG. 1 is a schematic representation of an automatic transmission gear train in accordance with a first preferred embodiment of the present invention.

The automatic transmission gear train, schematically shown in FIG. 1, comprises an input shaft 26, an output shaft 28 extending in a parallel relationship with respect to the input shaft 26, a Ravigneaux type compound planetary gear set 40, a simple planetary gear set 70 and a final reduction gear arrangement 84. The compound planetary gear set 40 is rotatably mounted about the input shaft 26 so as to establish, independently of the simple planetary gear set 70, first to fourth forward gear ratios and one reverse gear ratio. The simple planetary gear set 70 is rotatably mounted about the output shaft 28 and is drivingly connected to the compound planetary gear set 40 to provide a fifth forward gear ratio. To achieve the fifth forward drive ratio, the simple planetary gear set 70 is made operable to further increase the output speed of the compound planetary gear set which is operating at the fourth drive ratio.

For the very reason that the compound planetary gear set 40 is associated with the first to the fourth forward drive ratios and one reverse drive ratio, with the simple planetary gear set 70 having relation to the fifth forward drive ratio alone, the compound gear set 40 is often referred to as a "main transmission portion", as distinguished from an "auxiliary transmission portion" designating the simple planetary gear set 70.

In the first embodiment shown in FIG. 1, the compound planetary gear set 40 is drivingly coupled to the simple planetary gear set 70 through the use of a pair of drive and driven sprockets 54, 56 and an endless chain 60 wound therearound. As may be apparent to an ordinary skilled person, the input shaft 26 is connected to a known torque converter or fluid coupling 10 which, in turn, is operatively coupled to a crankshaft 12 of an engine (not shown for the sake of simplicity). On the other hand, the output shaft 28 is drivingly connected to the simple planetary gear set 70 which supplies its output to vehicle axles 92, 94 via a final reduction gear set 84 and a differential gear 90 to thereby provide a rotary drive force for the vehicle. The final reduction gear arrangement 84 is preferably in the form of a simple planetary gear set whose reduction ratio is kept constant, although other reduction devices than the one shown in FIG. 1 may equally be adopted to achieve the final speed reduction.

The compound planetary gear set 40, coaxially mounted about the input shaft 26 for rotary movement therewith, includes a first sun gear 42 selectively connectable to the input shaft 26 via a first sun gear hub 20, a second sun gear 44 selectively connectable to the input shaft 26 through a second sun gear hub 30, a first annulus or ring gear 48, a plurality of first planet or pinion gears 50 disposed around the first sun gear 42 in a meshing relationship thereto, a plurality of second planet or pinion gears 52 circumferentially distributed along the inner toothed surface of the annulus gear 48, each of the second pinion gears 52 meshing with the second sun gear 44 and the first pinion gears 50, and a first common planetary carrier 46 designed to rotatably support the first and the second pinion gears 50 and 52. Since the first pinion gears 50 are shorter in length than the second pinion gears 52, the first pinion gears 50 are commonly called as "short pinion gears", as opposed to "long pinion gears" indicative of the second pinion gears 52.

The input shaft 26 is selectively connected to the first sun gear hub 20 by virtue of either a first multi-disc clutch C1 and a second oneway clutch F2 or a fourth multi-disc clutch C4 which lies in a parallel relationship with respect to the clutches C1, F2. In addition, the input shaft 26 is selectively couplable to the second sun gear hub 30 by virtue of a second multi-disc clutch C2. The first sun gear hub 20 is adapted to transfer the input of the input shaft 26 to the first sun gear 42, whereas the second sun gear hub 30 is designed to transfer the input of the input shaft 26 to the second sun gear 44 of the compound planetary gear set 40. It should be noted that the second sun gear hub 30 is selectively grounded or anchored to a transmission casing 66 by virtue of a first drum-type brake B1. Use of the first drum-type brake B1 enables the second sun gear 44 of the compound gear set 40 to act as a reaction member in the event that the former is brought into engagement.

Additionally, the input shaft 26 may be selectively connected to the first common planetary carrier 46 of the compound gear set 40 by virtue of a third multi-disc clutch C3. Disposed in parallel between the transmission casing 66 and the first planetary carrier 46 are a second multi-disc brake B2 which is selectively operable to connect the first planetary carrier 46 to a stationary portion of the transmission casing 66 and a first oneway clutch F1 which normally serves to prevent counterclockwise rotation of the first planetary carrier 46.

Moreover, the first annulus gear 48 is permanently connected to the drive sprocket 54 through a rotating drum 53 so as to deliver the output of the compound planetary gear set 40 to the drive sprocket 54. As set forth hereinbelow in detail, the compound planetary gear set 40 is operable to provide first to fourth forward drive ratios and one reverse drive ratio.

Turning now to the simple planetary gear set 70 illustrated in the lower part of FIG. 1, it is adapted to be rotatably driven by means of the driven sprocket 56 which receives rotary power from the drive sprocket 54. The simple planetary gear set 70, coaxially mounted about the output shaft 28, includes a third sun gear 72 selectively connectable to the driven sprocket 56. Coaxially disposed about the third sun gear 72 is a second annulus gear 74 that delivers the output of the simple planetary gear set 70 to the final reduction gear arrangement 84. Circumferentially provided between the third sun gear 72 and the second annulus gear 74 are a plurality of, e.g., three, third pinion gears 78, each rotatably supported by a second planetary carrier 76. At all times, the second planetary carrier 76 remains rigidly coupled to the driven sprocket 56.

As shown in the lower part of FIG. 1, a fifth multi-disc clutch C5 is utilized to selectively connect the third sun gear 72 to the driven sprocket 56. It can be appreciated that a third multi-disc brake B3 is disposed between the transmission casing 66 and the third sun gear 72 and further that a third oneway clutch F3 lies between the driven sprocket 56 and the third sun gear 72 in a parallel relationship with respect to the third multi-disc brake B3 and the fifth multi-disc clutch C5. The third brake B3 is selectively operable to anchor the third sun gear 72 to the transmission casing 66, whereas the third oneway clutch F3 ensures that the torque be transmitted from the driven sprocket 56 to the third sun gear 72 even though the fifth clutch C5 is in a released condition.

The final reduction gear arrangement 84 serves to further reduce the rotational speed of the second annulus gear 74 operatively connected thereto, thereby producing an increased torque to be delivered to the known differential gear 90. It suffices to say that the final reduction gear arrangement 84 is intended to simply increase the torque at the final stage of the power transmission and is operable at a constant reduction ratio.

Operation of the instant gear train will now be set forth in the following with reference to FIGS. 1 and 2. For the sake of convenience and with a view to avoiding redundancies, the following description is focused on the first to fifth forward drive ratios in "D" range and one reverse drive ratio. FIG. 2 shows a chart that identifies the engaged clutches and brakes in small circles. As used herein, the term "clockwise" or "counterclockwise" is intended to mean the direction of rotation of the gear train components as seen from the right-hand side of FIG. 1.

First Forward Drive Ratio

As is apparent from the table of FIG. 2, the first forward drive ratio of "D" range is established by way of engaging the first and fifth multi-disc clutches C1, C5 and causing the first, second and third oneway clutches F1, F2, F3 to be locked. This creates a driving connection between the input shaft 26 and the first sun gear hub 20, permitting the first sun gear 42 to be rotatably driven clockwise. At this moment, the first oneway clutch F1 prevents any counterclockwise rotation of the first planetary carrier 46 to thereby have the carrier 46 act as a stationary reaction member. Clockwise rotation of the sun gear 42 enables the first pinion gears 50 to rotate counterclockwise, thus causing the second pinion gears 52 to undergo clockwise rotation. Such clockwise rotation of the second pinion gears 52 ensures that the first annulus gear 48 be subjected to clockwise rotation at a first, lowest speed.

The rotary power of the first annulus gear 48 is transmitted to the drive sprocket 54 through the rotating drum 53 and, then, to the second planetary carrier 76 of the simple planetary gear set 70 via the chain 60 and the driven sprocket 56.

Since the third sun gear 72 is rigidly connected to the driven sprocket 56 by virtue of the fifth multi-disc clutch C5 and the third oneway clutch F3, the second carrier 76 cannot be subjected to any relative movement with respect to the third sun gear 72. This results in a unitary rotation of the simple planetary gear set 70 as a whole. Thus the rotational speed established at the compound planetary gear set 40 is delivered to the final reduction gear arrangement 84 with no torque or speed variation, thereby providing the first forward drive ratio.

Second Forward Drive Ratio

The second forward drive ratio is accomplished by way of further engaging the first multi-disc brake B1 under the first speed condition and bringing the first oneway clutch F1 into a free-wheeling state. As in the first speed set forth above, the input from the input shaft 26 will cause the first sun gear 42 to rotate clockwise, which, in turn, leads to a counterclockwise rotation of the first pinion gears 50 and then to a clockwise rotation of the second pinion gears 52. Because of the second sun gear 44 being kept stationary by means of the first brake B1, the first planetary carrier 46 will begin to rotate clockwise, ensuring that the first annulus gear 48 be subjected to a synchronous clockwise rotation at a second, somewhat increased, rotational speed as compared with the first forward drive ratio.

The rotary power of the first annulus gear 48 is delivered to the drive sprocket 54 through the rotating drum 53 and, then, to the second planetary carrier 76 of the simple planetary gear set 70 via the chain 60 and the driven sprocket 56. As the third sun gear 72 is rigidly connected to the driven sprocket 56, the second planetary carrier 76 cannot be subjected to any relative movement with respect to the third sun gear 72. This results in a unitary rotation of the simple planetary gear set 70 as a whole, thus providing the second forward drive ratio.

Third Forward Drive Ratio

The third forward drive ratio is attained by way of further engaging the third multi-disc clutch C3 and disengaging the first brake B1 under the second speed condition. The input from the input shaft 26 is delivered to the first sun gear 42 as well as to the first planetary carrier 46 via the first and third multi-disc clutches C1, C3. Due to the concurrent input to the first sun gear 42 and the first planetary carrier 46, they will rotate with the first annulus gear 48 as a unit at the same speed and in the same direction as those of the input shaft 26, which rotation is delivered to the drive sprocket 54 through the rotating drum 53.

In the same manner as described above with regard to the second speed, the clockwise rotation of the drive sprocket 54 is transmitted to the second planetary carrier 76 of the simple planetary gear set 70 with the aid of the chain 60 and the driven sprocket 56. As the third sun gear 72 is rigidly connected to the driven sprocket 56 by means of the fifth multi-disc clutch C5, the second carrier 76 cannot be subjected to any relative movement with respect to the third sun gear 72. This results in a unitary rotation of the simple planetary gear set 70 as a whole, thus establishing the third forward drive ratio.

Fourth Forward Drive Ratio

The fourth forward drive ratio is fulfilled by way of further engaging the first brake B1 under the third speed condition, with the second oneway clutch F2 brought into a free-wheeling state. Under that condition, the first planetary carrier 46 is made to rotate clockwise, the second sun gear 44 being held stationary by means of the first brake B1. This causes the second pinion gears 52 to rotatably drive the first annulus gear 48 in the same direction as the first planetary carrier 46 but at a speed faster than the rotational speed of the input shaft 26. Such a gear ratio is usually referred to as an "overdrive" state.

Unlike the third forward drive ratio, the power input from the input shaft 26 toward the first sun gear 42 is automatically disconnected by the free-wheeling action of the second oneway clutch F2. The reason for the oneway clutch F2 coming into the free-wheeling condition is that the first pinion gears 50 will endow the first sun gear 42 with a tendency to rotate counterclockwise. The rotary power of the first annulus gear 48 is delivered to the drive sprocket 54 via the rotating drum 53.

As in the third speed explained above, the clockwise rotation of the drive sprocket 54 is transmitted to the third planetary gear set 70 with the aid of the chain 60 and the driven sprocket 56. Due to the fact that the third sun gear 72 is fixedly secured to the driven sprocket 56 by means of the fifth multi-disc clutch C5, the rotary power of the driven sprocket 56 will be concurrently fed to the second planetary gear set 76 and the third sun gear 72. By way of such concurrent power input, the simple planetary gear set 70 is brought into a "direct-coupling" state to rotate as a unit. As a result, the drive ratio established by the compound planetary gear set 40 suffers no variation in the simple planetary gear set 70, thus providing the fourth forward drive ratio.

As indicated in FIG. 2, an engine brake or hill brake effect is obtainable in the fourth forward drive ratio. The engine brake effect per se is widely known in the art and will be explained in detail with regard to the fifth forward ratio.

Fifth Forward Drive Ratio

The fifth forward drive ratio is provided by way of further engaging the third multi-disc brake B3 and releasing the fifth multi-disc clutch C5 under the fourth speed condition, with all the oneway clutches rendered free-wheeling. At the fifth speed, the compound planetary gear set 40 is adapted to act in the same fashion as set forth above in respect of the fourth speed.

The simple planetary gear set 70 is, however, operable in a differing way. Namely, as the third sun gear 72 is disconnected from the driven sprocket 56 and remains stationary by means of the third multi-disc brake B3, the third pinion gears 78 are caused to rotate around the third sun gear 72 by the input power of the second planetary carrier 76, with the result that the second annulus gear 74 can be overdriven at an increased speed. In this way, the fifth forward drive ratio is established to enable the motor vehicle to run at the highest speed.

It should be appreciated that the so-called engine brake or hill brake effect is obtainable at the fifth forward drive ratio. Specifically, in the event that a motor vehicle equipped with the present power train goes down a slope under a "coasting" or cruising state, for instance, the input from the vehicle wheels (not shown) may be reversely delivered to the engine through the planetary gear set 70, the driven sprocket 56, the chain 60, the drive sprocket 54 and the compound planetary gear set 40 in the stated sequence. Accordingly, such input speed of the vehicle wheels tends to be multiplied by virtue of the gear train so that the transmission input shaft is urged to rotate at an even higher speed than the engine crankshaft. However, since the engine is operating at a minimum RPM under the coasting state, the tendency of the transmission input shaft to rotate at the higher speed is automatically suppressed by the resistant "motoring torque" of the engine crankshaft, resulting in a rapid decrease in the vehicle wheel speed.

Reverse Drive Ratio

As marked by "R" in FIG. 2, the reverse drive ratio is produced by way of engaging the second multi-disc clutch C2, the fifth multi-disc clutch C5 and the second multi-disc brake B2. The input from the input shaft 26 is delivered to the second sun gear 44 via the second multi-disc clutch C2. Since the first planetary carrier 46 is kept stationary by means of the second brake B2, the clockwise rotation of the second sun gear 44 should be converted into a counterclockwise rotation of the first annulus gear 48 owing to the action of the second pinion gears 52.

The counterclockwise rotation of the first annulus gear 48 is transmitted to the drive sprocket 54 via the rotating drum 53 and, subsequently, to the second planetary carrier 76 with the aid of the chain 60 and the driven sprocket 56. Due to the fact that the third sun gear 72 is rigidly connected to the driven sprocket 56 by means of the fifth multi-disc clutch C5, the second planetary carrier 76 cannot be subjected to any relative movement with respect to the third sun gear 72. This results in a unitary counterclockwise rotation of the simple planetary gear set 70 as a whole, thus providing the reverse drive ratio.

Figure 3:
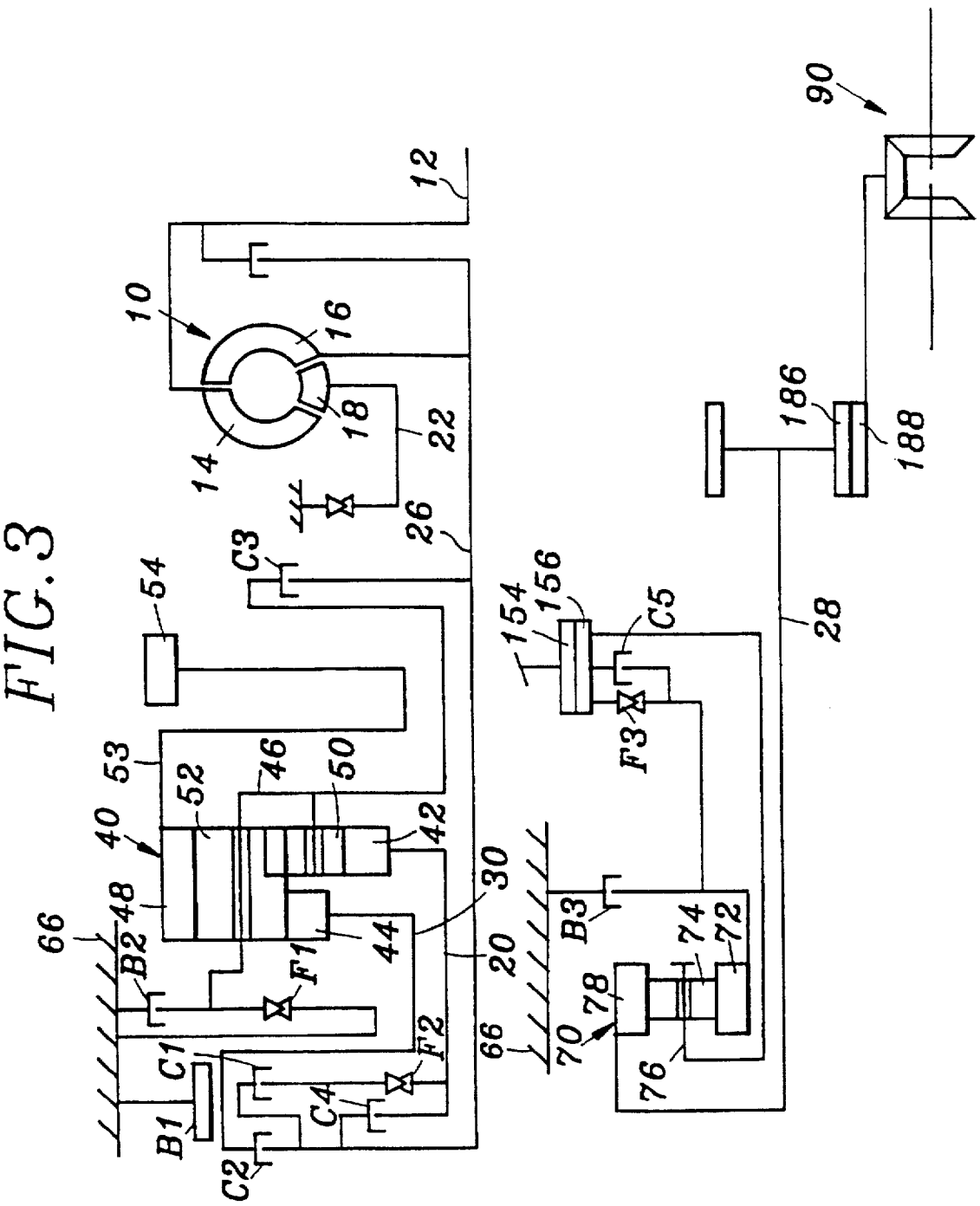
FIG. 3 is a schematic representation of an automatic transmission gear train in accordance with a second preferred embodiment of the present invention.

FIG. 3 shows a second embodiment of the present invention wherein the like parts or components are designated by the same reference numerals as used in the first embodiment of FIG. 1, with no further description given thereto for the purpose of convenience.

It can be seen in FIG. 3 that the power train of the second embodiment makes use of a compound planetary gear set 40, a simple planetary gear set 70 and a plurality of clutches and brakes, each of which does not differ structurally or functionally from the counterparts of the first embodiment.

However, a major difference between the first and the second embodiments resides in that drive and driven transfer gears 154, 156 are employed for the power delivery from the compound planetary gear set 40 to the simple planetary gear set 70, in place of the chain and sprocket device. Another key difference is that the task of achieving the final speed reduction is carried out by means of first and second mutually meshing reduction gears 186, 188. The first reduction gear 186 is of a smaller diameter than the second reduction gear 188 and is rigidly connected to the second annulus gear 78 of the simple planetary gear set 70 for rotation therewith. The second reduction gear 188 is coaxially coupled to the differential gear 90 to deliver the rotary power of the first reduction gear 186 thereto.

In operation, since the drive transfer gear 154 is in a meshing relationship with respect to the driven transfer gear 48, the clockwise rotation of the first annulus gear 48 should be converted to the counterclockwise rotation of the second annulus gear 78 and vice versa. However, thanks to the first and second reduction gears 186, 188, the rotational direction of the differential gear 90 will finally coincide with that of the first annulus gear 48 as in the first embodiment.

While the present invention has been shown and described with reference to the particular embodiments, it will be apparent to those skilled in the art that many changes and modifications may be made without departing from the spirit and scope of the invention as defined in the appended claims.

What is claimed is:

1. An automatic transmission for use in a motor vehicle having a transmission casing and a gear train contained in the casing for providing five forward and one reverse gear ratios, said transmission comprising:

(a) an input shaft;

(b) a compound planetary gear set coaxially mounted about said input shaft for rotary movement therewith, said compound planetary gear set including a first sun gear selectively connectable to said input shaft by means of a first clutch means, a second sun gear selectively couplable to said input shaft by means of a second clutch means and selectively anchorable to said transmission casing by means of a first brake means, a first annulus gear rotatably mounted around said first and second sun gears, a plurality of first pinion gears meshing with said first sun gear, a plurality of second pinion gears disposed to mesh with each of said second sun gear, said first pinion gears and said first annulus gear, and a first planetary carrier for rotatably supporting said first and second pinion gears, said first planetary carrier selectively connectable to said input shaft by means of third clutch means and selectively anchorable to said transmission casing by means of a second brake means;

(c) an output shaft disposed in parallel with said input shaft;

(d) a simple planetary gear set coaxially mounted about said output shaft for rotary movement therewith, said simple planetary gear set including a third sun gear drivingly connected to said first annulus gear by means of a fourth clutch means and selectively anchorable to said transmission casing by means of a third brake means, a second annulus gear rigidly connected to said output shaft, a plurality of third pinion gears circumferentially disposed between said third sun gear and said second annulus gear, and a second planetary carrier rotatably supporting said third pinion gears, said second carrier drivingly connected to said first annulus gear; and (e) means for delivering rotary power from said compound planetary gear set to said simple planetary gear set.

2. The automatic transmission as recited in claim 1, wherein said means for delivering rotary power includes a drive sprocket rigidly connected to said first annulus gear for rotation therewith, a driven sprocket rigidly connected to said second planetary carrier and selectively couplable to said third sun gear by means of said fourth clutch means and a chain wound around said drive and driven sprockets.

3. The automatic transmission as recited in claim 1, wherein said means for delivering rotary power includes a drive transfer gear adapted to rotate with said first annulus gear and a driven transfer gear meshing with said drive transfer gear to receive rotary power therefrom, said driven transfer gear rigidly connected to said second planetary carrier for rotation therewith and selectively couplable to said third sun gear by means of said fourth clutch means.

4. The automatic transmission as recited in claim 2, wherein said gear train further comprising a final reduction gear arrangement for lowering the rotational speed of said second annulus gear to thereby produce an enhanced torque.

5. The automatic transmission as recited in claim 4, wherein said final reduction gear arrangement includes a simple planetary gear set whose reduction ratio is kept constant.

6. The automatic transmission as recited in claim 1, wherein said first clutch means includes a first multi-disc clutch, a second oneway clutch arranged in a serial relation to said first multi-disc clutch and a fourth multi-disc clutch disposed in parallel to said first multi-disc clutch and said second oneway clutch, each of said first and fourth clutch means selectively operable to connect said input shaft to said first sun gear.

7. The automatic transmission as recited in claim 6, wherein said second clutch means includes a second multi-disc clutch selectively operable to connect said input shaft to said second sun gear.

8. The automatic transmission as recited in claim 7, wherein said third clutch means includes a third multi-disc clutch which selectively and operably connects said input shaft to said first planetary carrier.

9. The automatic transmission as recited in claim 8, wherein said fourth clutch means includes a fifth multi-disc clutch which selectively and operably connects said first annulus gear to said third sun gear, and a third oneway clutch disposed in parallel to said fifth multi-disc clutch.

10. The automatic transmission as recited in claim 9, wherein said first brake means includes a first drum-type brake which selectively and operably secures said second sun gear to said transmission casing.

11. The automatic transmission as recited in claim 10, wherein said second brake means includes a second multi-disc brake which selectively and operably anchors said first planetary carrier on said transmission casing, and a first oneway clutch disposed in parallel to said second multi-disc brake for preventing the rotation of said first planetary carrier in a given one direction.

12. The automatic transmission as recited in claim 11, wherein said third brake means includes a third multi-disc brake which selectively and operably anchors said third sun gear on said transmission casing.

* * * * *